US008826307B2

(12) United States Patent
Nagampalli et al.

(10) Patent No.: US 8,826,307 B2
(45) Date of Patent: Sep. 2, 2014

(54) EXTENSIBLE PRIVATE DRIVER INTERFACE

(75) Inventors: Narasimha Rao S.s. Nagampalli, Bellevue, WA (US); Alireza Dabagh, Kirkland, WA (US); Alok Manchanda, Redmond, WA (US); Taroon Mandhana, Redmond, WA (US); Sharad Mittal, Redmond, WA (US); Olivier Contant, Redmond, WA (US); Noel W. Anderson, Bellevue, WA (US); Bernard Aboba, Bellevue, WA (US); Jerry E. Peterson, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1175 days.

(21) Appl. No.: 12/106,255

(22) Filed: Apr. 18, 2008

(65) Prior Publication Data

US 2009/0265720 A1  Oct. 22, 2009

(51) Int. Cl.
*G06F 3/00* (2006.01)
*G06F 9/44* (2006.01)
*G06F 9/46* (2006.01)
*G06F 13/00* (2006.01)

(52) U.S. Cl.
USPC .......................................................... 719/321

(58) Field of Classification Search
None
See application file for complete search history.

(56) References Cited

U.S. PATENT DOCUMENTS

| 5,317,693 | A | 5/1994 | Cuenod et al. |
|---|---|---|---|
| 6,038,625 | A | 3/2000 | Ogino et al. |
| 6,842,789 | B1 | 1/2005 | Nazari |
| 7,024,434 | B2 | 4/2006 | Fuller et al. |
| 7,966,622 | B1* | 6/2011 | Purser et al. ................... 719/321 |
| 2003/0188175 | A1 | 10/2003 | Volk et al. |
| 2004/0221298 | A1 | 11/2004 | Cedola |
| 2005/0090248 | A1* | 4/2005 | Shen et al. ................. 455/432.1 |
| 2005/0149948 | A1 | 7/2005 | Gupta et al. |
| 2005/0182830 | A1 | 8/2005 | Abhishek et al. |
| 2006/0010265 | A1* | 1/2006 | Aiken et al. ..................... 710/33 |
| 2006/0031545 | A1 | 2/2006 | Manders et al. |
| 2006/0206300 | A1 | 9/2006 | Garg et al. |
| 2007/0046562 | A1* | 3/2007 | Polivy et al. ................... 345/1.2 |
| 2007/0129860 | A1* | 6/2007 | Voeller ............................. 701/29 |

OTHER PUBLICATIONS

Rawether for Windows, http://www.rawether.net/embedded/downloads/Rawether%20Guide.doc, Jul. 29, 2003, printed Apr. 18, 2008, pp. 1-40.

(Continued)

*Primary Examiner* — H S Sough
*Assistant Examiner* — William C Wood
(74) *Attorney, Agent, or Firm* — John Jardine; Andrew Sanders; Micky Minhas

(57) ABSTRACT

A computer with an extensible framework for facilitating communication between a software component installed on the computer and a device driver that executes functions in response to vendor-specific command objects (e.g., OIDs). The framework defines data structures and a standardized format for defining and implementing private interfaces. After selecting a private interface that is commonly supported by a software component and a driver, a private communication path may be established by an operating system component to facilitate the transfer of command information from the software component to the driver. The private communication path allows commands packaged as OIDs to be routed from software components to intended drivers. By defining private interfaces which route commands from software components to intended drivers, the extensible framework mitigates potential incompatibilities that may arise when drivers created by different vendors include OIDs with the same OID value.

16 Claims, 5 Drawing Sheets

(56) References Cited

OTHER PUBLICATIONS

Customized OIDs and Status Indications, http://msdn2.microsoft.com/en-us/library/aa504019.aspx, printed Dec. 4, 2007, 1 page.

The Component Object Model from http://msdn2.microsoft.com/en-us/library/ms694363(VS.85).aspx, printed on Apr. 18, 2008, 1page.
Component Object Model from http://en.wikipedia.org/wiki/Component_Object_Model, printed Apr. 18, 2008, pp. 1-14.

* cited by examiner

EXTENSIBLE PRIVATE DRIVER INTERFACE

BACKGROUND

Many computer systems include various hardware devices for providing functionality to the computer system. For example, a computer system may include one or more network cards to allow the computer to access a network, such as the Internet or the World Wide Web, a sound card to enable the computer to produce sound output to speakers, and a video card to allow visual images to be displayed on a monitor. Most computer hardware devices are associated with a driver (i.e., device driver), which is software that translates information coming to/from the device to allow various computer programs executing on the computer to interact with the device.

A device driver simplifies programming by acting as a translator between a device and the applications or operating systems that use it. For example, high-level code for an application can be written independently of the specific hardware device it may control. Each version of a device, such as a sound card, may require its own specialized commands. In contrast, most applications access devices (such as playing a sound file through speakers on a computer) by using high-level, generic commands. The driver accepts these generic commands and converts them into the low-level commands required by the device.

These commands are sometimes represented as programming objects, called "OIDs." An interface protocol, such as NDIS, has numerous predefined OIDs and a computer operating system that supports an NDIS interface routes the predefined OIDs to device drivers connected to the computer through an NDIS interface. In some instances, independent hardware vendors (IHVs) may develop devices with drivers that can perform functions not represented by predefined OIDs. For these devices, one or more custom, or private, OIDs may be defined. An operating system may route these private OIDs to device drivers similar to standard OIDs, providing a mechanism for software components on the computer to invoke the additional functions of the device.

SUMMARY

To facilitate the use of devices and drivers supporting functions identified by private commands, an extensible framework for communicating information representing private commands between software components and drivers is provided. The framework conveys private command information, which may be represented as private OIDs, from software components to drivers that execute those private commands. To avoid conflicts that could occur if two IHVs defined private OIDs using the same identifiers, but intended to cause different actions on different devices, each private OID is communicated as part of a data structure that includes private interface identification information, uniquely identifying an interface of a driver for which that command is intended. In some embodiments, the private interface identification information may include a vendor code, an interface identifier and, in some embodiments, a version identifier.

Even if the same private OIDs are used by different IHVs, the OIDs defined by each IHV will be routed to the intended device driver. Moreover, this result is achieved even if the software components issuing the commands are developed separate from the drivers and therefore have no explicit connection to them. In this way, hardware and software development can be performed at separate places and at separate times and can be separate from the development of the operating system. A computer can be assembled with significant flexibility, using hardware devices from IHVs and software components from ISV's.

In another aspect, routing of private OIDs to specific drivers may be facilitated by each driver exposing a discovery interface through which information about private OIDs supported by that device driver may be obtained. Such a discovery interface allows the framework or other components of a computer on which a driver is installed, to ascertain which drivers support which private interfaces, and enables routing of private OIDs to the intended devices.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
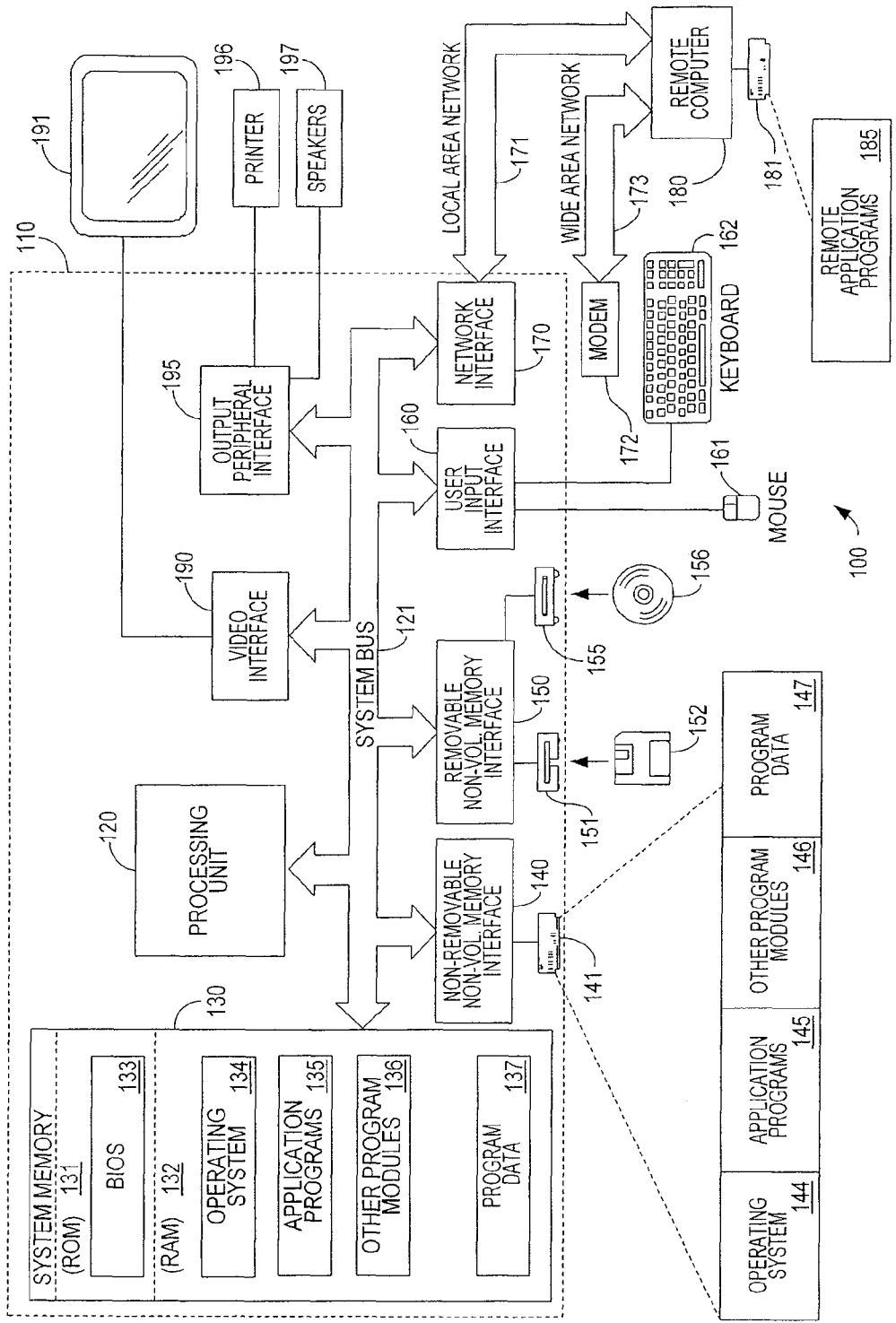
FIG. 1 is a diagram of a computing device on which various embodiments of the invention may be executed.

Applicants have recognized and appreciated that unpredictable or unintended operations may occur in a computer system as more independent hardware vendors (IHVs) develop devices independently of the software that controls those devices. Known operating systems provide a framework for facilitating such development by allowing independently developed software and hardware components to interact. Such a framework allows independent development of devices, including hardware and hardware drivers, and software that access functions of those devices by providing a mechanism to route command information, such as OIDs, from the software to the hardware.

However, the inventors have recognized and appreciated that by avoiding the close link between software and device development, the risk of conflicts is increased. If multiple IHVs use the same identification information for a private OID, a command generated by a software component may be applied to a device for which it is not intended, causing unpredictable or unintended operation of a computer. To avoid these negative consequences, the framework for communicating command information from software components to devices may be adapted to facilitate routing specific commands to the intended devices.

Appropriate routing of commands may be achieved through a new interface format in which IHVs are each assigned an interface "name space." Within the name space, the IHV may assign interface names for devices created by the IHV. Software developers creating software to interact with those devices may use the names and name space to direct commands to those devices.

In some embodiments, name space information is represented using vendor specific codes. Such codes may be assigned by an operating system developer or other third party to ensure that each vendor receives a unique code. Private commands intended to be executed on devices created by an IHV may be tagged with the vendor-specific code assigned to that IHV. In addition, commands may be tagged with information identifying a private interface for which the command is intended and may alternatively or additionally be tagged with other values, such as those that indicate a version of the interface or driver for which the command is intended. These additional values, because they fall within a vendor's name space as indicated by the vendor code, may be defined by each IHV independently and each IHV may ensure that the assigned values within its name space are unique.

An operating system framework may use the IHV name space information to route commands to the intended device. The framework may also support mechanisms that identify which private interfaces are supported by devices installed in the system. Such interface discovery may also be facilitated through the use of discovery interfaces in drivers provided by IHVs. The framework may query each installed driver through such a discovery interface to learn the interfaces supported.

The framework described herein provides significant flexibility and extensibility to existing driver interfaces, and allows for new devices and software modules to be independently developed and successfully incorporated into a computer without having to know which other devices and software modules may also installed on the computer.

FIG. 1 illustrates an example of a suitable computing system environment 100 on which embodiments of the invention may be implemented. The computing system environment 100 is only one example of a suitable computing environment and is not intended to suggest any limitation as to the scope of use or functionality of embodiments of the invention. Neither should the computing environment 100 be interpreted as having any dependency or requirement relating to any one or combination of components illustrated in the exemplary operating environment 100.

Embodiments of the invention are operational with numerous other general purpose or special purpose computing system environments or configurations. Examples of well known computing systems, environments, and/or configurations that may be suitable for use with embodiments of the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Embodiments of the invention may be described in the general context of computer-executable instructions, such as program modules, being executed by a computer. Generally, program modules include routines, programs, objects, components, data structures, etc. that perform particular tasks or implement particular abstract data types. Embodiments of the invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing embodiments of the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
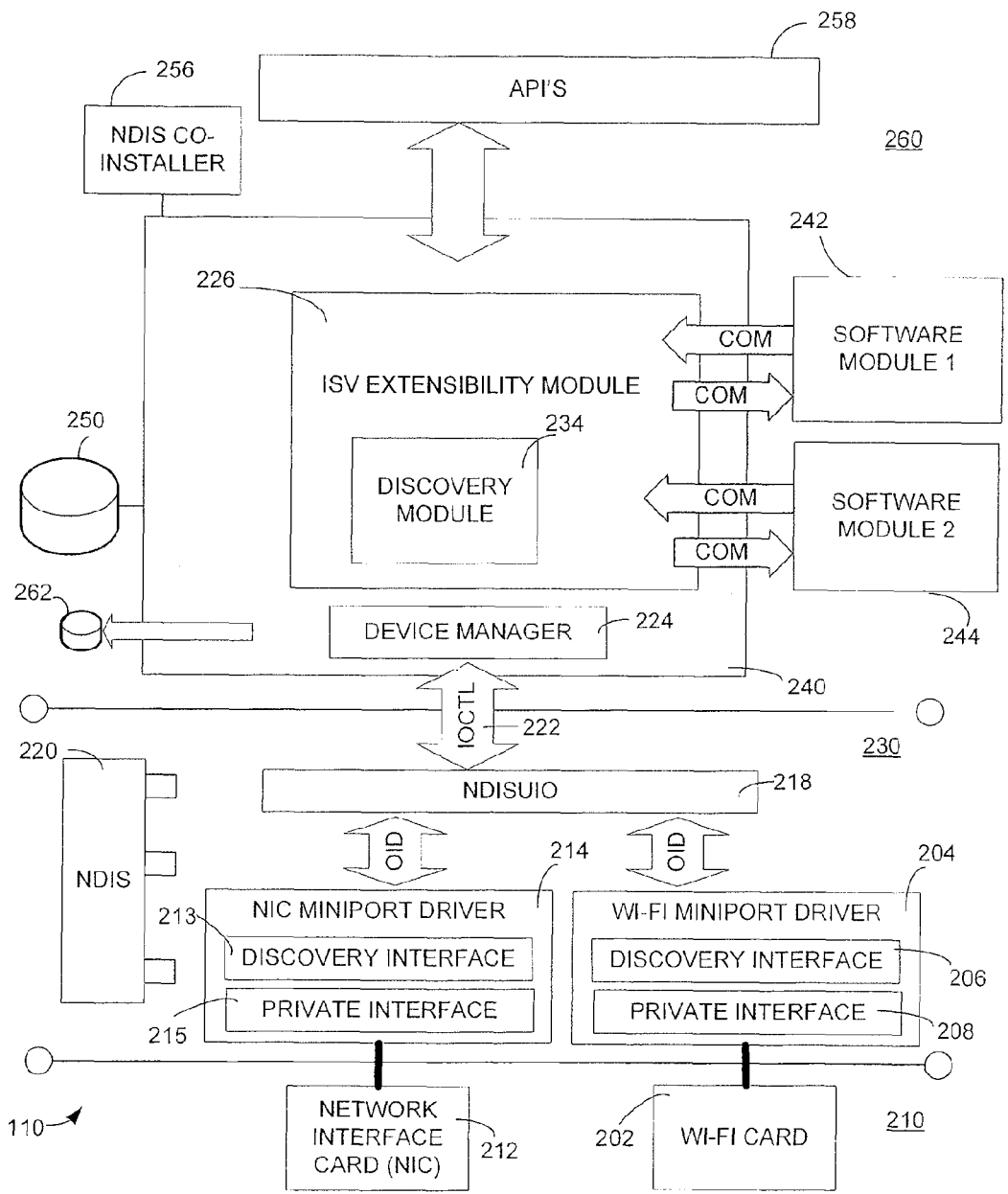
FIG. 2 is a block diagram showing selected components of a computer according to an embodiment of the invention.

FIG. 2 illustrates components of computer 110, which contain an extensible framework that supports communications between various software components and one or more drivers. The architecture illustrated in FIG. 2 is segmented into a hardware mode 210, a kernel mode 230 and a user mode 260. In the example illustrated, components within hardware mode 210 are implemented as hardware components. Components within kernel mode 230 are software components implemented as part of an operating system for a computer. Components within user mode 260 are also software components that may be provided as part of the operating system. However, in contrast to the components in kernel mode that may directly interact with the hardware, the software components within user mode 260 interface with the underlying hardware of a computer through components in kernel mode 230.

FIG. 2 provides an example embodiment only. It is not necessary that software components be separated into a kernel mode and a user mode as illustrated. Further, it is not necessary that components illustrated as being implemented in software be implemented in software or only in software. Some or all of the components could be implemented as programmable logic devices or other suitable hardware components. Similarly, some or all or the functions of components illustrated as being implemented in hardware could alternatively be implemented in software. For example, some or all of the functions performed by hardware devices, such as Wi-Fi card 202 or network interface card (NIC) 212, could be implemented as part of a software module executing in kernel mode 230.

It should be appreciated that any other suitable hardware components, including, but not limited to sound cards, video cards, or gaming interface cards, may be substituted for Wi-Fi card 202 and/or NIC 212, and only two devices are illustrated for simplicity. In the example illustrated in FIG. 2, Wi-Fi card 202 may be a wireless network card configured to send and receive radio signals according to a wireless standard such as Wi-Fi or WiMAX, and NIC 212 may be a conventional network card that communicates using a specific physical layer and a data link layer standard such as Ethernet or token ring. Either or both of Wi-Fi card 202 and NIC 212 may be implemented as a printed circuit board containing circuitry that plugs into a bus 121 within computer 110. However, a "card" could be implemented in any suitable way. For example various circuitry components could be mounted on a mother board or other assembly within computer 110. Accordingly, the specific implementation of Wi-Fi card 202, NIC 212 or any other hardware device that may be used instead or in addition to Wi-Fi card 202 or NIC 212 is not a limitation of the present invention.

Regardless of how devices (e.g., Wi-Fi card 202, NIC 212) are implemented, interfaces to the devices are provided by associated miniport drivers. For example, Wi-Fi miniport driver 204 provides an interface to Wi-Fi card 202, whereas NIC miniport driver 214 provides an interface to NIC 212. Miniport drivers 204 and 214 may be software components implemented using software coding techniques as are known in the art. Drivers 204 and 214 may receive commands specifying operations to be performed by their associated devices. In response, miniport drivers 204 and 214 generate the appropriate control signals to the underlying hardware of Wi-Fi card 202 and NIC 212. Miniport drivers 204 and 214 may also receive status information from their associated devices. For example, status information received by miniport drivers 204 and 214 may relate to operating conditions experienced by Wi-Fi card 202 or NIC 212.

Drivers 204 and 214 interact with a component NDISUIO 218 through which commands may be passed. NDISUIO 218 is a protocol driver which allows miniport drivers 204 and 214 to interact with other components in computer 110. In the embodiment illustrated, Wi-Fi miniport driver 204 and NIC miniport driver 214 include standard driver interfaces. As a specific example, miniport drivers 204 and 214 may be configured to communicate according to the NDIS standard, illustrated in FIG. 2 by NDIS component 220. The NDIS standard allows commands to be exchanged as objects, referred to as OIDs, between miniport drivers 204 and 214 and NDISUIO 218. It should be appreciated that commands may relate to operations to be performed by a device, actions to be taken by the device to configure itself or may be requests for status information, or any other type of commands, and embodiments of the invention are not limited in this respect.

An OID may be associated with a command that specifies a function to be performed by a driver. An OID may be identified by an OID value, which also identifies the function to be performed by a device when the OID is applied to it. Interface standards may include a certain number of pre-defined OIDs, to which devices to be connected to a computer through an interface using that standard may respond.

Some devices that may be controlled through software may be designed to perform functions under software control for which standard OIDs are not defined. To enable software components to generate commands to cause a device to execute such functions, custom, or private OIDs may be defined. The OID value for a private OID may be specified by the IHV that develops the driver on which the OID is supported. The process by which private OIDs are provided to miniport drivers 204 and 214, consistent with the extensible framework according to various embodiments of the invention are described in more detail with reference to FIGS. 3-5, described below.

In addition to the standard interface, according to one embodiment of the invention, each of drivers 204 and 214 may comprise two additional interfaces for providing commands to their associated devices. For example, Wi-Fi miniport driver 204 comprises Wi-Fi discovery interface 206 and a Wi-Fi private interface 208; whereas NIC miniport driver 214 comprises NIC discovery interface 213 and NIC private interface 215. A discovery interface may provide a mechanism for a device to indicate the private OIDs that it will support. The private interface may allow a framework within the operating system to provide a private OID to the device. In this way, a software component that wishes to invoke a function supported by a device for which there is no standardized command defined may learn that a device that can execute that function is available and can invoke that command. As described in greater detail below, a framework within the operating system can use these interfaces to ensure that a private OID is routed only to the device that is intended to execute the command represented by the OID.

A discovery interface and a private interface may be implemented in the drivers in any suitable way, and embodiments of the invention are not limited in this respect. In one implementation, an interface may be implemented using OIDs that are an extension of the standard interface. For example the identification information for one such OID may specify that the device respond by providing information as part of a discovery operation. The information provided as part of the discovery operation may identify private OIDs, which may be defined by an IHV that provided the associated device. More detail about the functionality of discovery interfaces 206 and 213 and private interfaces 208 and 215 will be provided below. Similarly, the identification information for another such OID may specify that the device respond by executing a private OID embedded within that OID.

In the example of FIG. 2, computer 110 may contain other components to provide commands via IOCTL path 222, for example, operating system (OS) component 240. In one implementation, OS component 240 may be a configuration module for configuring one or more drivers. OS component 240 provides a mechanism by which a device and associated driver may receive commands from other components in user mode 260. The commands may be packaged as OIDs by a module in OS component 240 or by some other user mode component. In this example, OS component 240 may be implemented as a software component supporting interfaces with other software components. However, the specific form in which OS component 240 interfaces with other components is not critical to the invention and any suitable types of interface may be used.

In the example illustrated in FIG. 2, OS component 240 includes a device manager 224. In one embodiment, device manager 224 may send commands to NDISUIO 218 to the appropriate miniport driver for which the command is intended. For example, the commands may be packaged and sent in the form of one or more OIDs. In addition, device manager 224 may provide any other function related to managing devices such as Wi-Fi card 202 or NIC 212 and their associated drivers, and embodiments of the invention are not limited in this respect.

OS component 240 may obtain information from other components for sending commands to Wi-Fi card 202 and/or NIC 212 and their associated drivers. For example, OS component 240 may be implemented as a configuration module, and commands may be sent from OS component 240 to configure, for example, Wi-Fi miniport driver 204. In one embodiment, information used to generate commands to configure Wi-Fi miniport driver 204 may be stored in profile store 250. Profile store 250 may contain information, or "profiles" related to driver configuration settings that are used when one or more software modules installed on the computer 110 interact with a driver. When implemented as a configuration module, OS component 240 may write information into profile store 250 defining a desired configuration of Wi-Fi card 202 and its associated drivers upon installation of Wi-Fi card 202. Subsequently, OS component 240 may retrieve this information from profile store 250 if Wi-Fi card 202 and its associated drivers require reconfiguration for any reason, including, but not limited to reinstallation of Wi-Fi card 202 and/or Wi-Fi miniport driver 204.

Profile store 250 may be implemented in any suitable way, including as a file or other data structure written to a disk or other non-volatile storage medium within computer 110. It should also be appreciated that profile store 250 may store configuration information from any device installed on computer 110 including NIC 212 or any other device, and embodiments of the invention is not limited in this respect.

OS component 240 may also store information in logging module 262. Logging module 262 also may be implemented as files or other data structures written to a disk or other suitable storage medium associated with computer 110. In some implementations, the information written to logging module 262 may define events associated with failed communications between a software module and NIC 212. This information may later be used by other tools or components that analyze events associated with software-driver communications, such as diagnostic applications that help a user resolve problems with software-driver communications.

Other information used by OS component 240 may be obtained from other user mode components, including application programs, through APIs 258. APIs 258 may be implemented using conventional software technology for providing interfaces between components. However, the structure of APIs 258 is not critical to the invention and APIs 258 may be implemented in any suitable way. APIs may be called by applications, or by various components of the operating system of computer 110, but the method of invoking APIs is not critical to the invention.

FIG. 2 illustrates other components that may also interface with OS component 240. For example, FIG. 2 illustrates an NDIS co-installer 256. NDIS co-installer 256 may contain computer executable instructions that are used during installation of an NDIS driver, such as Wi-Fi miniport driver 204 or NIC miniport driver 214. NDIS co-installer 256 may be implemented as is known in the art or in any other suitable way.

Other modules of OS component 240 are also illustrated in FIG. 2. For example, OS component 240 may contain one or more extensibility modules, such as ISV extensibility module 226. According to some embodiments, ISV extensibility module 226 may facilitate communication between software modules 242 and 244 and devices such as Wi-Fi miniport driver 204 and NIC miniport driver 214. In the embodiment illustrated, software modules 242 and 244 may be implemented as "plug-ins" or other self-contained software modules that may be added to a computer system. Accordingly, these components may be written by an independent software vendor. If these components perform functions that involve control of any of the devices installed in a computer with an architecture as illustrated, they may generate commands for those devices that are represented by private OIDs.

Though, according to one inventive embodiment, any software module may generate one or more private OIDs that contain commands for devices to perform one or more functions. As a specific example, software module 242 may be designed to use a standardized encryption algorithm (e.g. RSA) for encrypting security-sensitive data to be transferred between computers via the Internet using NIC 212. To command NIC miniport driver 214 to implement RSA encryption, software module 242 may generate one or more private OIDs that facilitate the desired configuration of NIC miniport driver 214.

Figure 3:
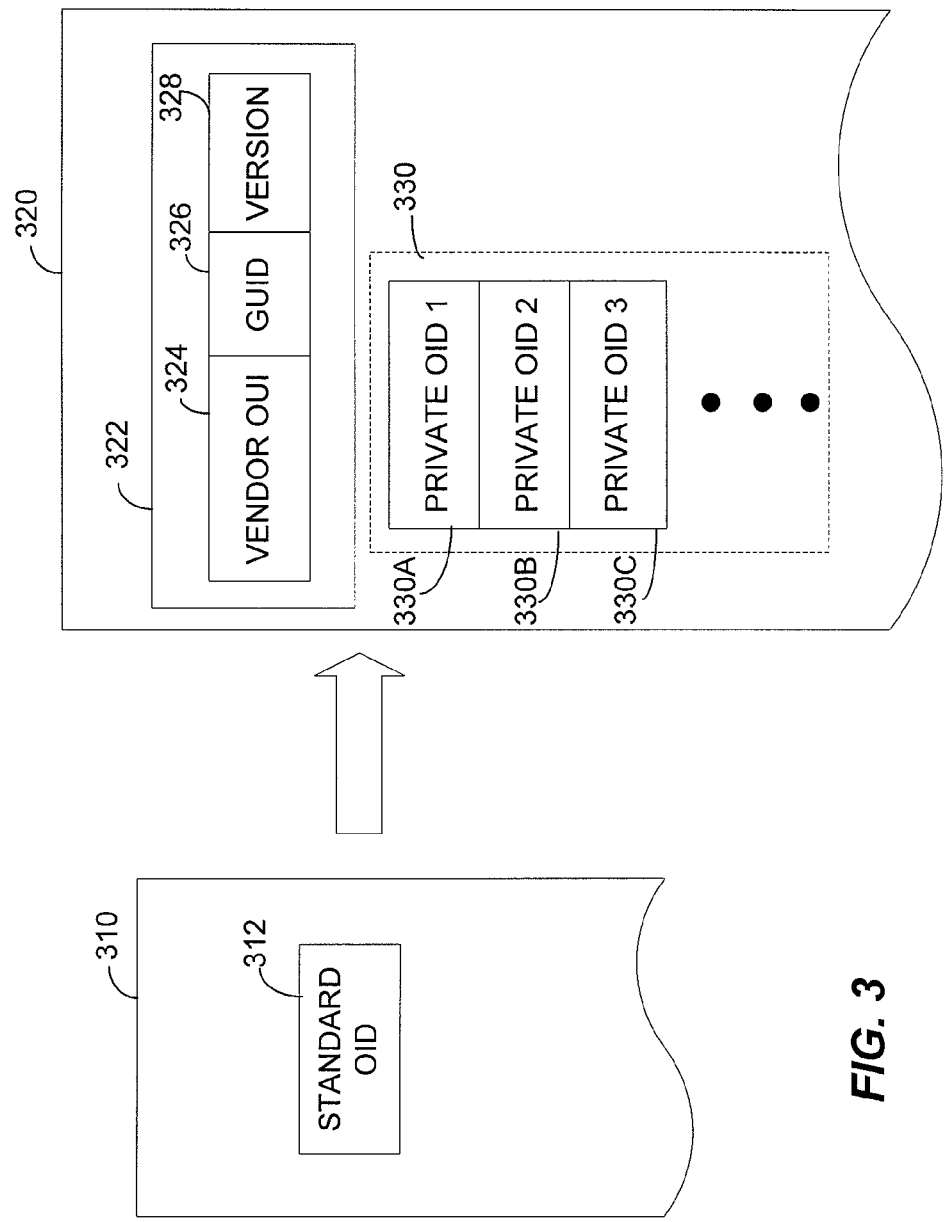
FIG. 3 is a sketch of data structures that may be used within a standardized framework according to an embodiment of the invention.

Private OIDs generated by software module 242 may be passed to ISV extensibility module 226 within OS component 240 where they may be packaged into data structures containing private interface identification information as described in more detail with reference to FIG. 3, below. In one embodiment, private OIDs may be passed from software module 242 to ISV extensibility module 226 according to the Component Object Module (COM) standard. COM is a platform-independent, distributed, object-oriented system for creating binary software components that can interact. In compliance with the COM standard, software module 242 may transmit private OIDs to ISV extensibility module 226 as COM objects. It should be appreciated that OIDs may be transmitted between various components in computer system 100 using any appropriate system, such as .NET, JAVA, or any other framework, and the object-oriented COM system is provided merely as an example. Moreover, it should be appreciated that command information may be passed in different forms through different portions of the system. For example, a command may be represented in one form with component 240, as a second form within NDISUIO 218 and in a third form as it is passed to driver 214. Nonetheless, the information, regardless of its specific form, represents the same command and may be regarded as an OID associated with that command.

Whereas software module 242 may desire to command NIC miniport driver 214 to implement an RSA encryption algorithm, software module 244 may be designed to use a proprietary encryption algorithm to encrypt, for example, financial data that is transmitted over the Internet via Wi-Fi card 202. Prior to using software module 244 to transmit data via Wi-Fi card 202, software module 244 may generate one or more private OIDs containing commands for Wi-Fi miniport driver 204 to implement the proprietary encryption algorithm. For example, software module 244 may provide ISV extensibility module 226 with private OIDs to support various features of the proprietary encryption scheme (e.g., encryption keys). The private OIDs generated by software module 244 may be packaged as data structures containing private interface identification information and be transmitted to Wi-Fi miniport driver 204 via IOCTL path 222 and NDISUIO 218.

As mentioned above, IHVs may define support for private OIDs for a particular device. For example, an IHV which developed Wi-Fi card 202 and associated Wi-Fi miniport driver 204 may wish to support the proprietary encryption scheme implemented by software module 244. Accordingly, the IHV may define a private interface 208 which allows private OIDs related to the proprietary encryption scheme of software module 244 to interact with Wi-Fi card 202. Because software modules are often developed independently from hardware devices and their associated drivers, software modules and/or OS component 240 may not know which drivers support private interfaces for particular private OIDs generated by software modules.

Thus, according to one embodiment of the invention, ISV extensibility module 226 may further comprise a discovery module 234. Discovery module 234 may be used to send a request to a discovery interface of a driver to determine which private interfaces the driver supports. In one implementation, the request may be generated by discovery module 234 in response to an initial execution of a software program on the computer 110. In other implementations, the request may be generated every time a software program executes on the computer 110, or in response to any other event occurring on the computer 110, such as the generation of an interrupt or installation of a new software module or driver on computer 110. For example, an installation process executed when Wi-Fi card 202 is installed on the computer 110 may invoke discovery module 234 to send a request to discovery interface 206 to determine which private OIDs are supported by the Wi-Fi miniport driver 204. In one implementation, a list of private OIDs supported by Wi-Fi miniport driver 204 which is provided to OS component 240 by discovery interface 206 may be stored in profile store 250 for future reference by various components of the computer 110. In another implementation, a list of supported private OIDs may not be stored at all.

In one embodiment, the discovery module 234 may also send a request to a software component to determine private OIDs that the component uses. The software component may respond to the request by providing a list of private OIDs it uses. In this way, the operating system may obtain information it can use to notify the software component when devices that support the private OIDs it uses are available.

An embodiment of the present invention implements an extensible framework providing a standardized data structure format for packaging private OIDs generated by a software module so that those private OIDs reach the intended device for execution. Applicants have recognized that allowing IHVs to define OIDs by arbitrarily choosing an OID value to associate with the OID may result, in some circumstances, with different miniport drivers implementing OIDs having the same OID value. For example, a first IHV developing NIC 212 may define a first OID having an OID value 0xFF000001. When invoked, this first OID may be designed to implement an RSA encryption algorithm in NIC miniport driver 214. Independently, another IHV developing Wi-Fi card 202 may define a second OID also having the OID value 0xFF000001. When invoked, the second OID may be designed to implement a proprietary encryption algorithm in Wi-Fi miniport driver 204.

When only one of the two drivers is installed on the computer 110, the driver may properly support the functionality provided by the corresponding OID. However, if Wi-Fi miniport driver 204 is already installed on computer 110, and then NIC miniport driver 214 is installed on the same computer, it may not be clear where to direct OIDs having the OID value 0xFF000001, as Wi-Fi miniport driver 204 and NIC miniport driver 214 both have OIDs defined with the value 0xFF000001.

According to embodiments of the invention, an extensible framework provides a standardized format and protocol for routing private OIDs to intended drivers. The extensible framework allows an IHV to define private interfaces for a driver to allow private OIDs invoked by software modules to interact with the driver. Each interface may represent a mechanism for one or more private OIDs to be passed to the driver.

In one embodiment, the extensible framework allows IHVs to define a discovery interface for a driver. The discovery interface may respond to requests to provide information about interfaces that the driver supports, and a specific implementation will be described in more detail below. The extensible framework also provides a mechanism to supply private commands to the driver. The private commands may be provided using any suitable method or data structure, and a specific implementation according to one embodiment of the invention is provided below.

In one embodiment, a private interface may be implemented by passing a data structure 320 that includes private interface identification information 322 through an existing interface in the driver. The private interface identification information 322 may further comprise a vendor code 324, which uniquely identifies the vendor that developed the driver, and an interface ID which uniquely identifies the private interface. For example, the private interface identification information 322 may be eight bytes in length, where the first three bytes specify the vendor code 324, and the last five bytes specify the interface ID. The interface ID may further comprise a unique identifier such as globally unique identifier (GUID) 326 and in some embodiments, version information 328.

The data structure 320 may additionally comprise one or more private OIDs 330 including private OID data specifying commands to be performed by a driver. In the example shown in FIG. 3, the data structure 320 includes three private OIDs (330A, 330B, and 330C), which may comprise commands to support a proprietary encryption algorithm to be implemented on Wi-Fi miniport driver 204. In this example, private OID 330A may have an OID value of 0x00000001 and may correspond to a "Set key" operation, private OID 330B may have an OID value of 0x00000002 and may correspond to a "Query max key length" operation, and private OID 330C may have an OID value of 0x00000003 and may correspond to a "query support encryption algorithms" operation. Upon installation of Wi-Fi miniport driver 204 which defines at least one private interface to support the private OIDs 330 (or at some other suitable time as described above), private OIDs 330 may be transmitted to Wi-Fi miniport driver 204 to implement the proprietary encryption algorithm in Wi-Fi miniport driver 204.

It should be appreciated that the foregoing example is not limiting in any respect, and drivers may define private OIDs that provide other functions to modify the translation of data passing though a driver, including but not limited to, data compression, data authentication, or any other command information. In one implementation, commands may define functions for a driver to perform, according to a set, query, and notify protocol. For example, if the device is a network card, a set operation may command the driver to connect to a network, in a query operation the driver may be commanded to provide information about which channel the network card is connected to, and in a notification operation the driver may be commanded to provide status, signal strength, or any other information about the device associated with the driver.

In order to successfully pass data structure 320 containing private OIDs to a device via a private interface, the driver must recognize the private interface identification information in the data structure 320. However, some software modules which invoke private OIDs may be unaware of which private interfaces a driver supports, and particularly when new drivers are installed on computer 110. Accordingly, in one embodiment, drivers may implement a discovery interface which responds to requests from a discovery module to provide identifiers of each of the private interfaces that the driver supports. In one implementation, a driver may implement a discovery interface as an OID, and the driver may respond to the OID as with any other command.

Figure 4:
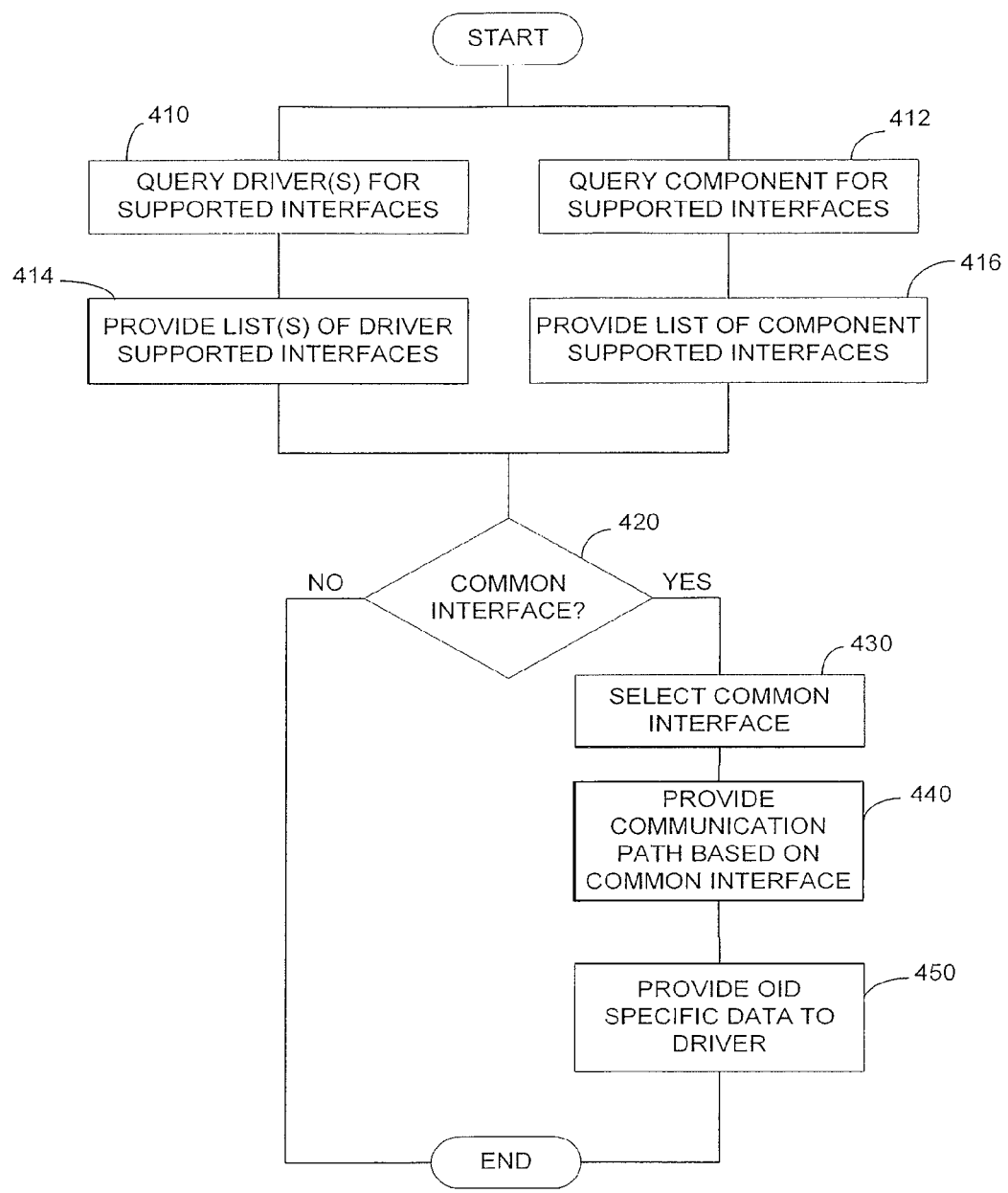
FIG. 4 is flow chart of a process for discovering commonly supported private interfaces and for providing configuration data to a driver according to an embodiment of the invention.

A process for detecting commonly supported private interfaces and for supplying private data to a driver via a private interface according to one embodiment of the invention is illustrated in FIG. 4. In the example provided below, software module 244 defines a data structure 320 with three private OIDs 330A, 330B, 330C designed to command Wi-Fi miniport driver 204 to implement a proprietary encryption algorithm. However, it should be appreciated that a similar process may be instituted for providing private OID data from any software module to any driver to implement any desired functionality, and embodiments of the invention are not limited in this respect.

In act 410, discovery module 234 in ISV extensibility module 226 sends a request to Wi-Fi miniport driver 204 for a list of private interfaces it supports. For example, the request may be in the form of an OID which includes information identifying the OID as a discovery request. In some embodiments, the discovery module 234 may also send a request to software module 244 to provide a list of supported interfaces in act 412. If act 412 is performed, it should be appreciated that acts 410 and 412 may be performed in any order, or alternatively, both the software module 244 and the driver 204 may be provided with requests simultaneously, and the order in which acts 410 and 412 are performed is not critical to the invention. Additionally, it should be appreciated that requests may be generated for multiple drivers that are installed on computer 110, and the timing of such multiple requests may be either simultaneous or non-simultaneous.

In act 414, in response to a request from discovery module 234 (e.g., via an OID), one or more drivers may provide a list of supported private interfaces to ISV extensibility module 226. In some implementations, if a request was also sent to a software module (e.g., software module 244), the software module may provide a list of supported private interfaces to ISV extensibility module 226 in act 416.

Upon determining which private interfaces the driver 204 supports, and optionally which private interfaces the software component 244 supports, it may be determined in act 420 if the driver 204 and the software component 244 share any common private interfaces. If it is determined that there are no common supported interfaces, it may not be possible for the ISV extensibility module 226 to provide a private communication path for private OIDs invoked by software module 244 to driver 204. Software module 244 may be configured to perform differently based on what functionality is supported by devices installed in a computer system. Accordingly, software module 244 may not perform certain operations if devices that implement private interfaces needed to execute those functions are not available.

Other actions alternatively or additionally may be taken in response to a detected incompatibility. For example, an indication of the incompatibility of the software module with the driver may be recorded in logging module 262 for later analysis by a user or a diagnostic program. An indication of the incompatibility of the software module with the driver may alternatively, or in addition to, be displayed on monitor 191 via APIs 258.

If it is determined in act 420 that at least one commonly supported private interface exists, one of the commonly supported interfaces may be selected in act 430. The commonly supported interface may be selected during execution of the software component when a function of a device, which can be invoked through that interface, is desired. If multiple commonly supported private interfaces are found, software module 244 may select a desired private interface from among the supported private interfaces.

Regardless of when or how the private interface is selected within the software module, when a desired private interface is selected, a private communication path may be established between the software module 244 and the driver 204 in act 440.

In an alternative implementation, a list of supported private interfaces may not be provided by software module 244 to ISV extensibility module 226. Rather, a list of supported private interfaces provided by Wi-Fi miniport driver 204 may be transmitted to software module 244, and upon receiving the list of supported private interfaces, software module 244 may determine commonly shared private interfaces and select a desired private interface. When the software module 244 reaches an execution point where a device function supported through a private interface is desired, an indication of the desired private interface may then be sent from software module 244 to ISV extensibility module 226, thereby enabling a private communication path to be established between software component 244 and driver 204 in act 440.

In yet another implementation, the driver 204 may generate an extensibility notification to be transmitted to one or more user mode components that are configured to understand the notification. For example, an extensibility notification may be transmitted via IOCTL 222 to OS component 240 and/or software component 244, and the extensibility notification may contain information to enable these components to establish a private communication path between the component and the driver 204 which generated the notification.

In the above example, the private communication path is established by the ISV extensibility module 226. This private communication path is implemented by routing commands, represented as private OIDs 330 in data structure 320, to Wi-Fi miniport driver 204 in act 450. These private OIDs command the driver 204 to perform one or more functions based on the private OID data. However, it should be appreciated that any component in the operating system of computer 110 may establish the private communication path between a software component and a driver, and embodiments of the invention are not limited in this respect. For example, a private communication path may be established by directly sending to the driver an OID containing private interface identification information that identifies a supported private interface.

Figure 5:
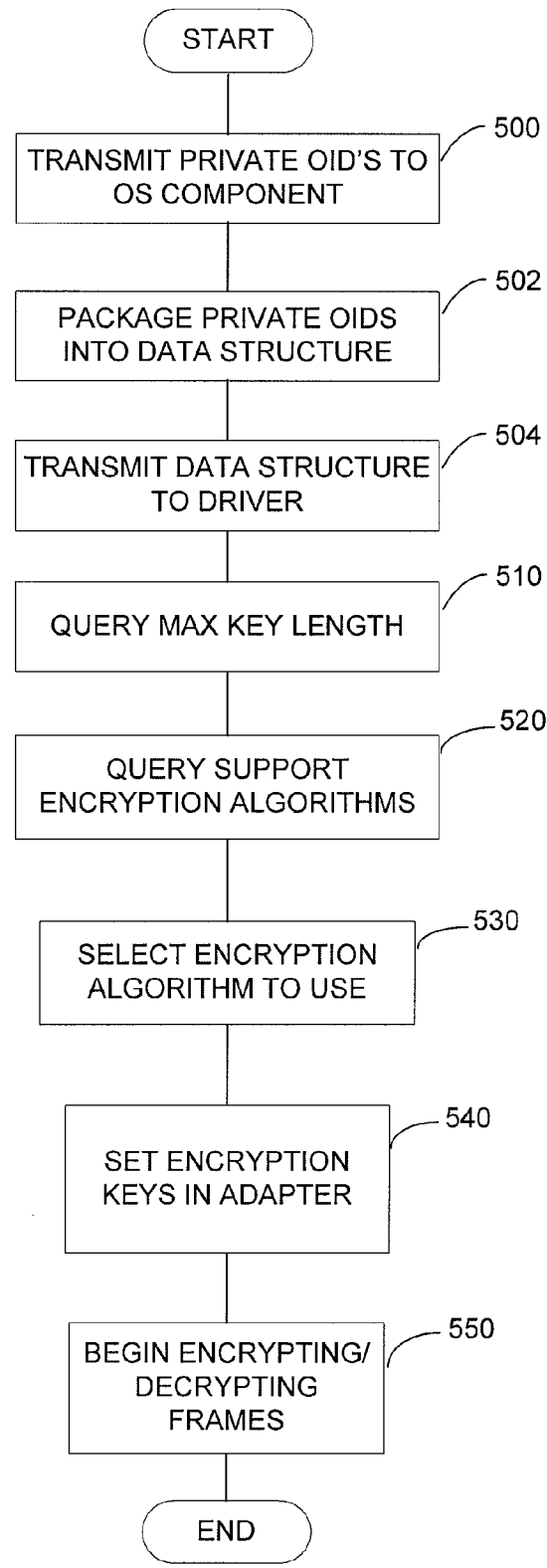
FIG. 5 is a flow chart of a process for providing private commands to a driver according to an embodiment of the invention.

FIG. 5 provides one exemplary implementation using the example provided above. In the example above, the software module 244 wants Wi-Fi miniport driver 204 to implement a proprietary encryption algorithm. Software module 244 configures driver 204 to perform this algorithm by sending to the driver three private OIDs (330A, 330B, and 330C) corresponding to "Set key," "Query key length," and "Query support encryption algorithms" operations respectively. These OIDs may be sent using a private communication path established as described above.

To implement the proprietary encryption algorithm in the driver 204, a sequence similar to that illustrated in FIG. 5 may occur. Private OIDs 330 generated by software module 244 may be transmitted from software module 244 to OS component 240 in act 500. OS component 240 (e.g., ISV extensibility module 226) may package the private OIDs 330 into a data structure 320 similar to that shown in FIG. 3 in act 502, including private interface identification information 322 which identifies the private interface 208 for the Wi-Fi miniport driver 204. The data structure is then passed through the extensible framework to the private interface 208 in act 504, after which the commands in the various private OIDs 330 may be executed in the driver 204. For example, in acts 510 and 520, private OIDs 330B and 330C may be invoked in turn, and the driver's max key length may be queried and supported encryption algorithms may be determined. In act 530, a desired encryption algorithm from the supported encryption algorithms may be selected. Then in act 540, the command specified in OID 330A, (i.e., "Set key") may command one or more encryption keys provided by software module 244 to be associated with the driver 204. After the driver is configured for proprietary encryption using the procedure shown in FIG. 5, outgoing frames provided by Wi-Fi card 204 may be encrypted with the proprietary encryption algorithm, and incoming frames may be decrypted in a similar manner in act 550.

The example above is merely provided for explanatory purposes, and a similar procedure may be implemented for any software module and any driver once a private communication path has been established between them. Furthermore, it should be appreciated that private commands may be sent from a software module to a driver at any time, provided that the driver recognizes the private interface identification information in a data structure passed to the driver from OS component 240.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of operating a computer comprising a first operating system component and a hardware device driver comprising a standard interface and at least one private interface, the hardware device driver driving a hardware device of the computer, the standard interface implementing standard command objects and the private interface implementing non-standard command objects designated by a vendor that produced the hardware device, wherein arbitrary user mode components communicate with arbitrary device drivers by passing command objects to the operating system component, the method comprising:

responding to an interface inquiry command object from the operating system component on the computer, the interface inquiry command object being directed to the hardware device driver, wherein the responding is performed by the operating system component and comprises generating in the operating system component a data structure related to the hardware device driver, the data structure comprising private interface identification information and at least one non-standard command object implemented by the private interface, the private interface identification information identifying the at least one private interface of the hardware device driver to receive the non-standard command object;

receiving, by the operating system component, the non-standard command object from the user mode component, and using the data structure to address the non-standard command object to the at least one private interface of the hardware device driver identified by the private interface identification information; and in response to receiving the at least one non-standard command object through the private interface, configuring the hardware device driver based at least in part on the non-standard command object.

2. The method of claim 1, wherein the private interface identification information comprises a vendor identifier, a unique identifier, and version information.

3. The method of claim 2, wherein the unique identifier is a globally unique identifier (GUID).

4. The method of claim 1, wherein the hardware device driver drives a network interface card (NIC).

5. The method of claim 1, wherein the configuring the hardware device driver comprises providing one or more encryption keys to the hardware device driver.

6. A computer readable storage device having a plurality of computer-executable components that, when executed on a computer, comprise:

a software module generating a data structure having a vendor identifier, a unique identifier for a private interface, version information, and at least one command object;

a device driver to drive a hardware device, the device driver comprising a standard interface and the private interface for executing at least one function defined by the at least one private command object in response to receiving the private command object through the private interface identified by the unique identifier, the standard interface implementing command objects defined by a driver interface specification, the private interface implementing private command objects, including the private command object, not defined by the driver interface specification, the private command objects implemented by the device driver having been specified by a producer of the hardware device; and an operating system that when executing provides, in accordance with the driver interface specification, a private communication path between the software module and the device driver, the private communication path being established for facilitating communicating the command information from the software module via the private interface to the device driver, the operating system using the unique identifier to route the private command object to the private interface.

7. The computer readable device media of claim 6, wherein the private communication path includes a tag to identify command objects transmitted via the path as related to the private interface.

8. The computer readable storage device of claim 6, wherein the device driver further comprises a discovery interface for identifying to the software module one or more private interfaces that the device driver supports.

9. The computer readable storage device of claim 6, wherein the unique identifier is a globally unique identifier (GUID).

10. The computer readable storage device of claim 6, wherein the hardware device comprises a network interface card, and wherein the device driver supports an interaction of the software module with the network interface card.

11. The computer readable storage device of claim 6, wherein the software module was developed by a first vendor and the device driver was developed by a second vendor that the hardware device.

12. A computing device comprising:

a driver framework, an operating system component, a hardware device, and a user mode component;

the driver framework implementing a standard driver interface specification to provide arbitrary user mode components with access to arbitrary device drivers managed by the driver framework, the driver framework managing a device driver for the hardware device;

the device driver comprising a standard interface according to the standard driver interface specification, the device driver further comprising a private interface not specified by the standard driver interface specification, the standard interface providing standard command objects specified by the standard driver interface specification for the arbitrary user mode components to invoke corresponding functions of the hardware device, the private interface providing non-standard command objects not specified by the standard driver interface specification for the arbitrary user mode components to invoke corresponding functions of the hardware device;

the operating system component querying the device driver, via the driver framework, to obtain and store an identifier of the private interface and indicia of the non-standard command objects; and the operating system component receiving a non-standard command object from a user mode component, and in response, according to the stored indicia, sending the identifier of the private interface and the non-standard command object to the driver framework which in turn uses the identifier of the private interface to route the non-standard command object to the private interface.

13. A computing device according to claim 12, wherein the standard driver interface specification comprises a version of the Network Driver Interface Specification (NDIS).

14. A computing device according to claim 12, wherein the driver framework comprises a protocol driver that uses the identifier of the private interface to route the non-standard command object to the private interface.

15. A computing device according to claim 12, wherein the hardware device comprises a network interface card.

16. A computing device according to claim 12, wherein the driver framework also routes command objects to interfaces of software components.

* * * * *